United States Patent
Frederick et al.

(10) Patent No.: US 9,975,501 B1
(45) Date of Patent: May 22, 2018

(54) MULTI-PURPOSE VEHICLE BED LINER AND DECK TOPPER

(71) Applicant: Toyota Motor Engineering & Manufacturing North America, Inc., Erlanger, KY (US)

(72) Inventors: Scott L. Frederick, Brighton, MI (US); Scott P. Robison, Dexter, MI (US); Adam D. Holmstrom, Pinckney, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days. days.

(21) Appl. No.: 15/611,185

(22) Filed: Jun. 1, 2017

(51) Int. Cl.
   *B60R 13/01* (2006.01)
   *B60J 7/16* (2006.01)
   *B62D 33/027* (2006.01)
   *B62D 33/03* (2006.01)

(52) U.S. Cl.
   CPC ............. *B60R 13/01* (2013.01); *B60J 7/1607* (2013.01); *B60R 2013/016* (2013.01); *B62D 33/0273* (2013.01); *B62D 33/03* (2013.01)

(58) Field of Classification Search
   CPC ................................ B60R 13/01; B60J 7/1607
   USPC ... 296/39.2, 100.03, 100.04, 100.06, 100.07, 296/100.08
   See application file for complete search history.

(56) References Cited

U.S. PATENT DOCUMENTS

| | | | |
|---|---|---|---|
| 3,181,909 A * | 5/1965 | Wise | B60P 3/42 296/10 |
| 4,681,360 A | 7/1987 | Peters et al. | |
| 4,875,731 A | 10/1989 | Ruiz | |
| 5,087,091 A | 2/1992 | Madill | |
| 7,922,229 B1 * | 4/2011 | Castillo | B60J 7/1607 296/186.3 |
| 8,398,137 B2 * | 3/2013 | Castillo | B60P 7/10 296/100.08 |
| 2003/0085584 A1 * | 5/2003 | Golden | B60R 13/01 296/39.2 |

(Continued)

FOREIGN PATENT DOCUMENTS

DE        10346703 A1 *   5/2005  .............. B60R 13/01

OTHER PUBLICATIONS

Machine translation of DE10346703A1, printed from the EPO website, Nov. 1, 2018.*

*Primary Examiner* — Jason S Morrow
(74) *Attorney, Agent, or Firm* — Christopher G. Darrow; Darrow Mustafa PC

(57) ABSTRACT

A multi-purpose bed liner and deck topper includes a shell that may be connected to a vehicle cargo bed. The shell is movable between a bed liner position and an inverted deck topper position. The shell includes a shell base and shell sidewalls extending from the shell base. A first shell endwall is detachably connected to a rear end of the shell and a second shell endwall is pivotally connected to a front end of the shell. The multi-purpose bed liner employs slide rails attached to the shell sidewalls and that are connectable to vehicle bed sidewalls to facilitate moving the shell between the bed liner position and the deck topper position. A pivot connector attached to the shell and pivotally connecting the shell to the slide rails enables the shell to be inverted when moving the shell between the bed liner position and the deck topper position.

19 Claims, 8 Drawing Sheets

(56) References Cited

U.S. PATENT DOCUMENTS

2015/0291017 A1* 10/2015 LaBiche ................ B60J 7/141
296/100.09

* cited by examiner

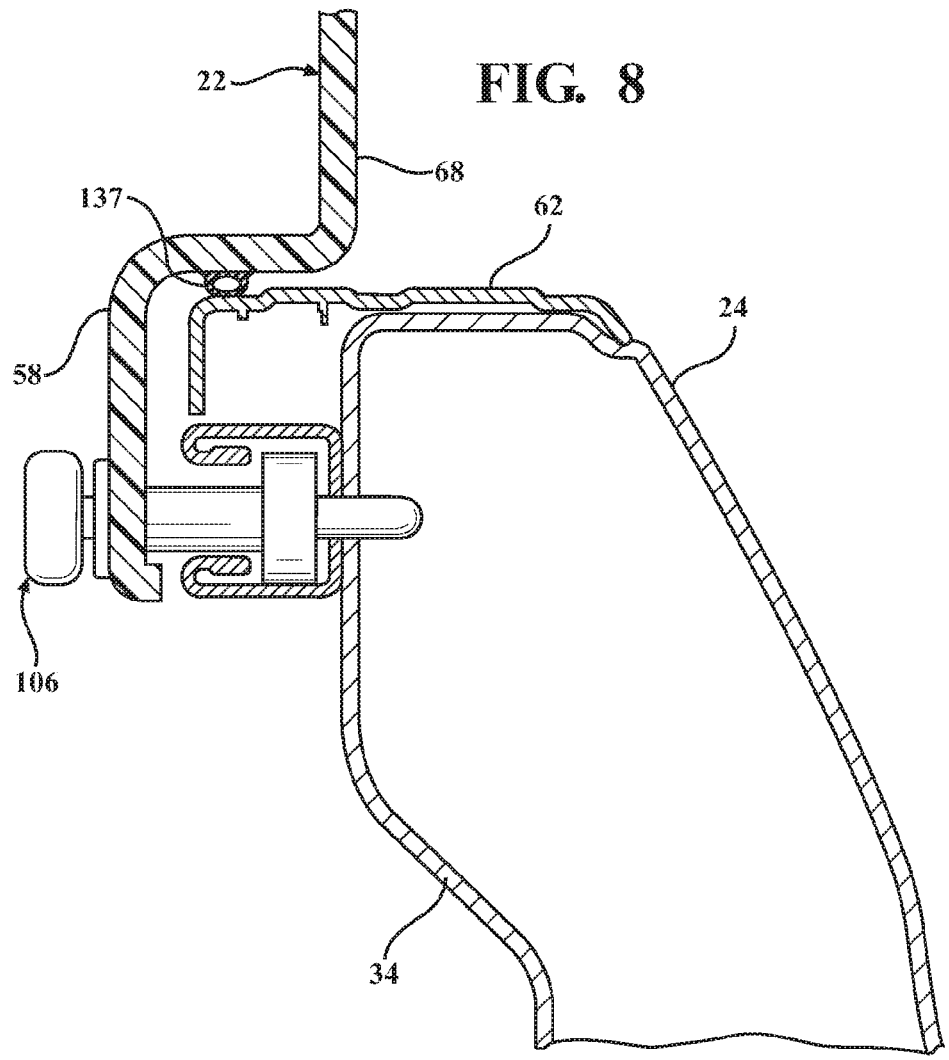

MULTI-PURPOSE VEHICLE BED LINER AND DECK TOPPER

BACKGROUND

Cargo loads may be transported in pickup trucks. Pickup trucks have an enclosed cab for transporting a driver and passengers seated side-by-side. An open top, cargo bed extends rearward from the cab. The cargo is partially bordered by two sides and a tailgate.

Pickup trucks are quite versatile in their ability to carry loads of varying configurations which may protrude above a height of the cab and from the rear of the truck with the tailgate either in an upright closed position or a horizontal open position. Since their cargo beds are open to the vehicle surroundings, they may be readily loaded and unloaded from both sides and a rear of the truck. The open cargo bed, however, provides little security, privacy and shelter from adverse weather.

Bed liners are commonly used to protect the cargo bed from damage caused by physical impacts, surface abrasion, and corrosion due to reactive chemicals. Bed liners used in pickup trucks may be configured as a drop-in type liner that includes a pre-formed rigid plastic component that form-fits the bed to be protected.

Truck caps that fit over the open cargo bed of the pickup truck are a way to provide shelter and security for cargo transported in the pickup truck. The caps can have fixed sides and a top that extend from the cab to a rear of the cargo bed. The rear end of the truck cap is typically closed by a door. Truck caps tend to be heavy and cumbersome to install and remove from the vehicle. It is often difficult for one person to attach or remove the truck cap. Truck caps also require a storage area when not in use.

SUMMARY

Disclosed is an automotive vehicle including a multi-purpose bed liner and deck topper for selectively converting a cargo bed of the vehicle between a closed configuration having an enclosed cargo bed and a pickup truck configuration having an open cargo bed. The multi-purpose bed liner includes a shell that may operate as a bed liner and be inverted for use as a deck topper. The multi-purpose bed liner may be mounted to a cargo bed of the vehicle. When used as a bed liner the multi-purpose bed liner protects the cargo bed from damage that may be caused by cargo transported in the vehicle. When inverted and used as a deck topper the multi-purpose bed liner provides a secure enclosure for protecting the cargo from the elements.

The multi-purpose bed liner may include a shell having a base and a pair of sidewalls extending from the shell base. A first shell endwall may be removably attached to a rear end of the shell. The first shell endwall may be positioned adjacent a rear opening in the cargo bed when the multi-purpose bed liner is arranged in the bed liner position, and adjacent a cab of the vehicle when the multi-purpose bed liner is arranged in the deck topper position. The first shell endwall may be entirely detached from the shell and stored on the tailgate of the vehicle when the multi-purpose bed liner is arranged in the bed liner position.

The multi-purpose bed liner may include a second shell endwall that may be pivotably connected to the shell base opposite the first shell endwall. The second shell endwall may be positioned adjacent the cab and opposite the rear opening in the cargo bed when the multi-purpose bed liner is arranged in the bed liner position. The second shell endwall may be positioned adjacent the rear opening in the cargo bed and opposite the cab when the multi-purpose bed liner is arranged in the deck topper position. The second shell endwall may be pivoted between a closed position and an open position when the multi-purpose bed liner is arranged in the deck topper position.

To facilitate moving the multi-purpose bed liner between the bed liner position and the deck topper position, the multi-purpose bed liner may be moveably connected to a pair of slide rails attached to the cargo bed right and left sidewalls. The slide rails extend along an entire length of the cargo bed. The slide rails enable the shell to be moved axially along the slide rails relative to the cargo bed between the bed liner position and an extended position.

The multi-purpose bed liner may include a pivot connector for connecting the shell to the slide rails. The pivot connector operates to both control axial movement of the shell along the slide rails and provide a pivot joint when the shell is located in the extended position that enables the shell to be pivoted between the extended position and the deck topper position.

BRIEF DESCRIPTION OF THE DRAWINGS

The various features, advantages and other uses of the present apparatus will become more apparent by referring to the following detailed description and drawings, in which:

FIG. 8 is a partial cross-sectional view of the shell and cargo bed sidewall with the shell arranged in the deck topper position.

DETAILED DESCRIPTION

Figure 1:
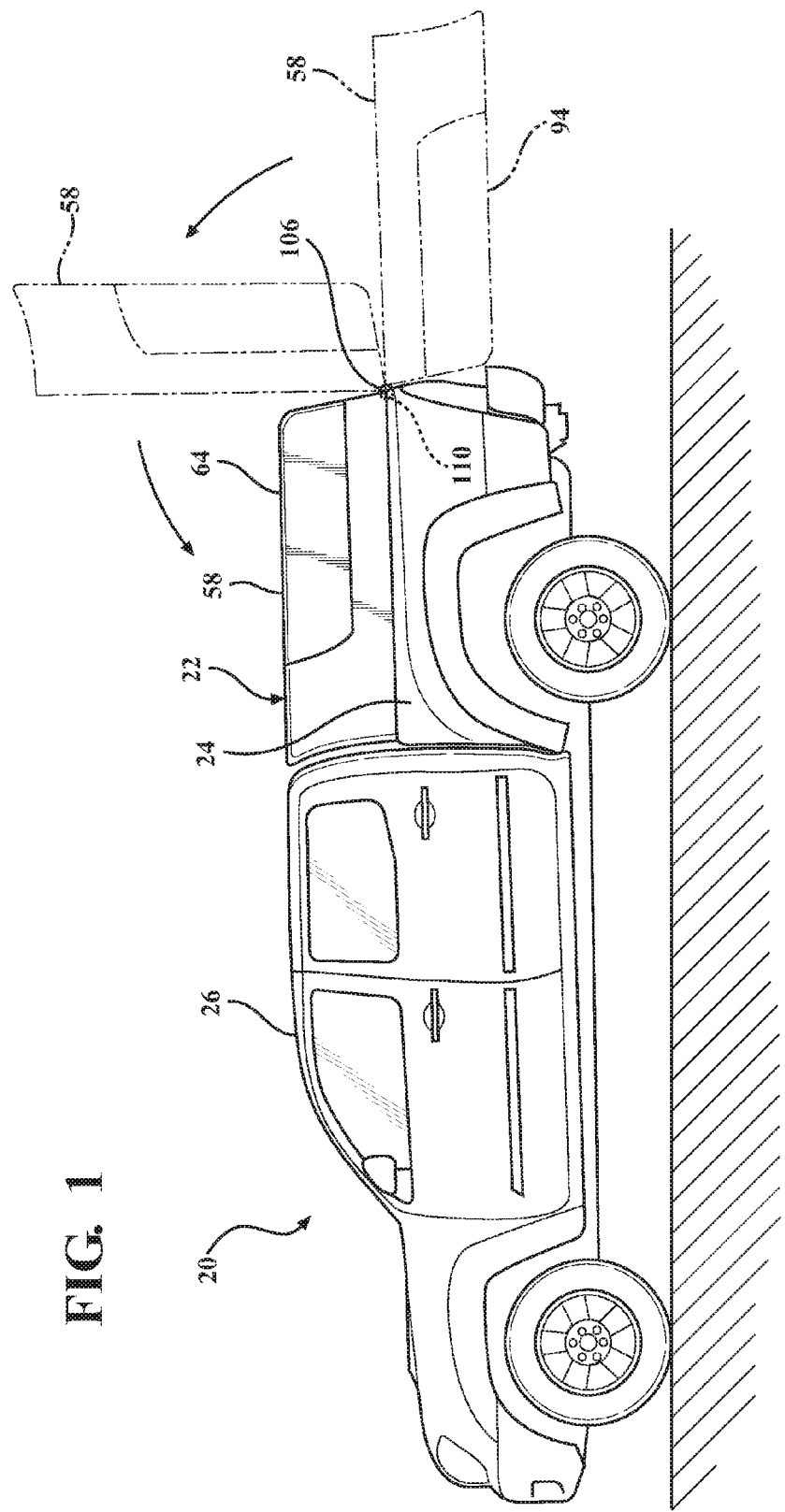
FIG. 1 is a side elevational view of an automotive vehicle illustrating a multi-purpose bed liner being moved between a bed liner position and a deck topper position.

Disclosed is an automotive vehicle including a multi-purpose bed liner and deck topper for selectively converting a cargo bed of the vehicle between a closed configuration having an enclosed cargo bed and a pickup truck configuration having an open cargo bed. Previously designed vehicle cargo beds typically use a combination of systems to protect the cargo bed from damage and provide shelter and security for the cargo. For example, a bed liner may be used to protect the cargo bed of the vehicle from damage caused by physical impacts, surface abrasion, and corrosion due to reactive chemicals. A separate truck cap may be used to provide shelter and security for cargo stored in the cargo bed. Using separate components to protect the cargo bed from damage and provide protection and security for the cargo can significantly increase the weight and cost of the vehicle. The disclosed multi-purpose bed liner and deck topper utilizes a moveable shell that may alternately be used as a bed liner and inverted for use as a truck cap. The shell may be mounted on slide rails to facilitate converting the multi-purpose bed liner and deck topper for use as a bed liner and as a truck cap.

Referring now to the discussion that follows and the drawings, illustrative approaches to the disclosed systems and methods are described in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or otherwise limit or restrict the claims to the precise forms and configurations shown in the drawings and disclosed in the following detailed description.

Figure 2:
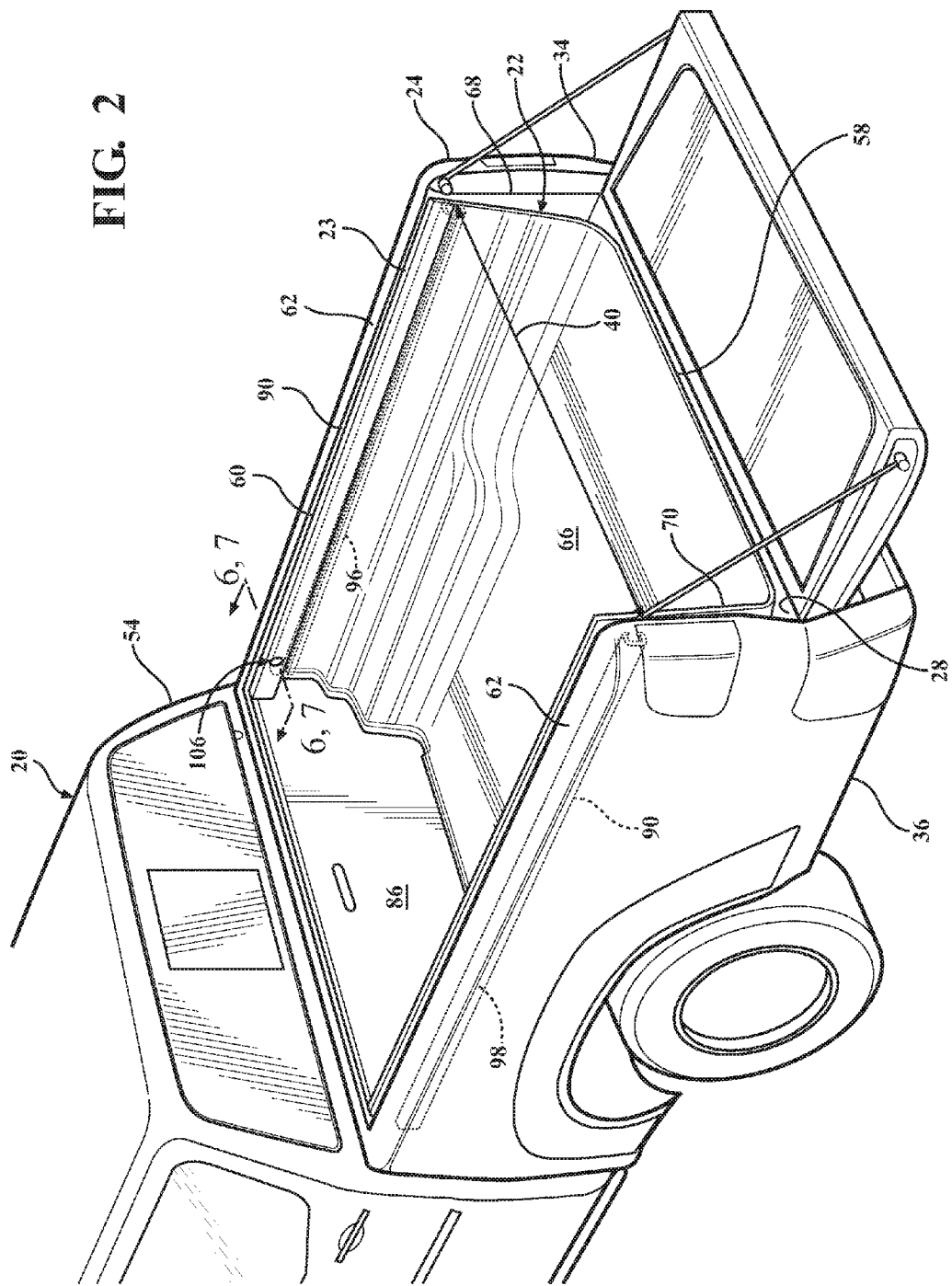
FIG. 2 is a rear perspective view of the vehicle with the multi-purpose bed liner arranged in the bed liner position.
Figure 4:
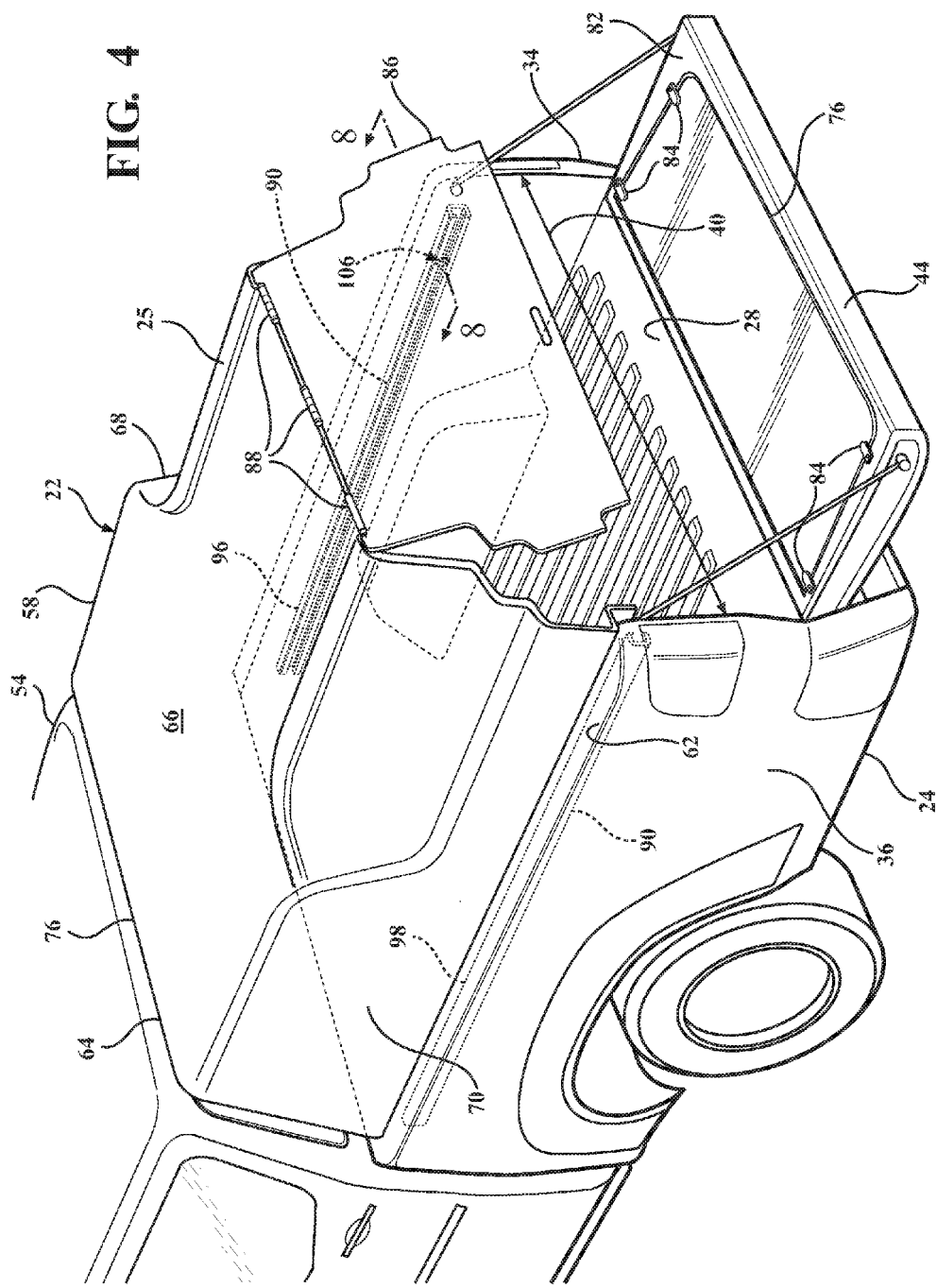
FIG. 4 is a rear perspective view of the vehicle with the multi-purpose bed liner arranged in the deck topper position.

With reference to FIGS. 1, 2 and 4, an automotive vehicle 20 may include a multi-purpose bed liner 22 that may operate as a bed liner 23, as illustrated for example, in FIG. 2, and inverted for use as a deck topper 25, as illustrated for example, in FIG. 4. The multi-purpose bed liner 22 may be mounted to a cargo bed 24, such as may be found on a pickup truck 26. The cargo bed 24 can be used for transporting cargo and have any of various configurations. When used as a bed liner 23 the multi-purpose bed liner 22 protects the cargo bed 24 from damage that may be caused by cargo transported in the cargo bed. When used as a deck topper 25 the multi-purpose bed liner 22 provides a secure enclosure for protecting cargo in the cargo bed 24 from the elements.

Figure 5:
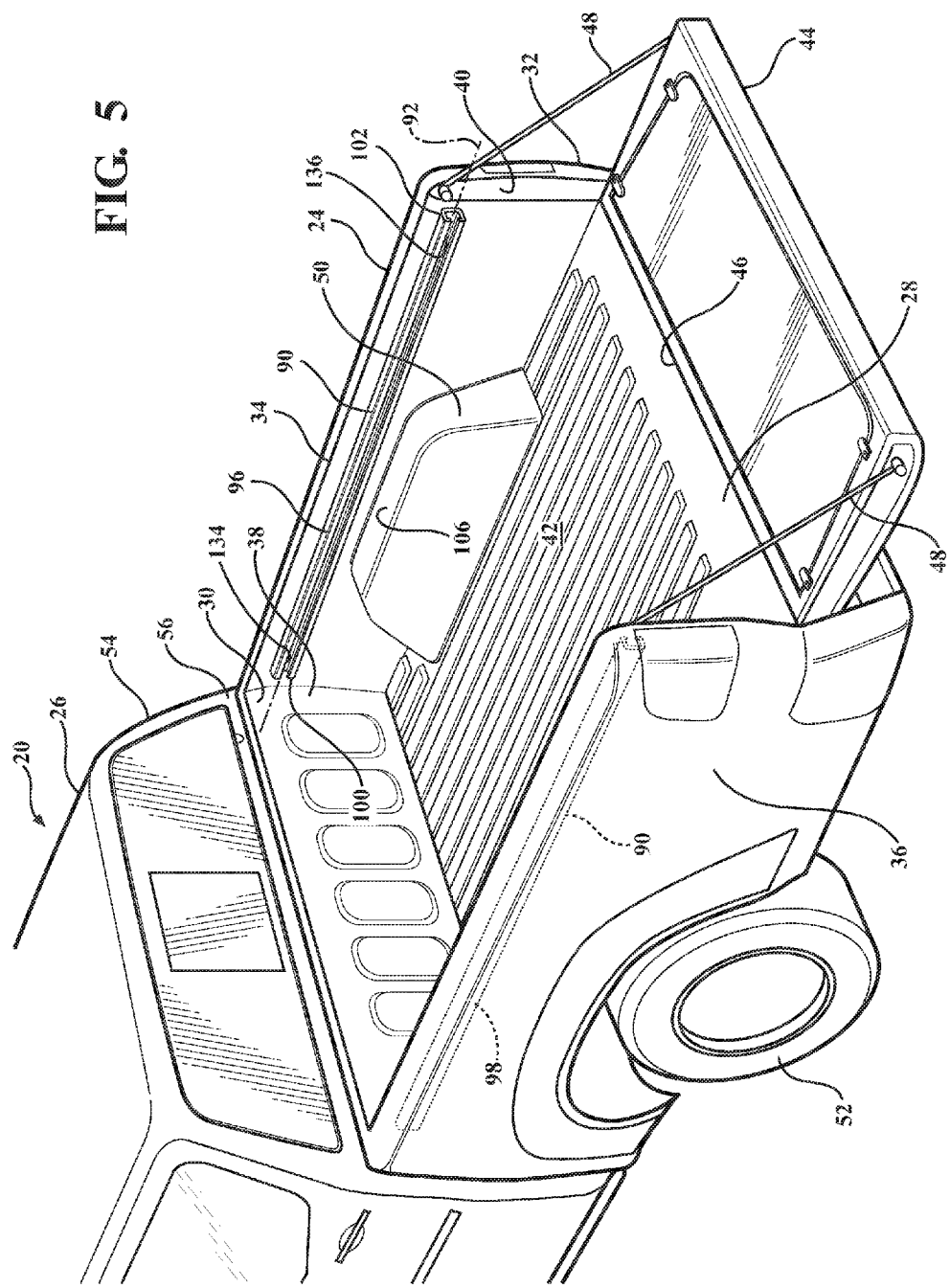
FIG. 5 is a rear perspective view of the vehicle with the shell removed from a cargo bed of the vehicle to illustrate a slide rail used to facilitate moving the shell between the bed liner position and an extended position.

With reference to FIG. 5, the multi-purpose bed liner 22 may be used in connection with various vehicle configurations. For example, the multi-purpose bed liner 22 may be used with the pickup truck 26 that includes the cargo bed 24 for transporting cargo. The cargo bed 24 may include a bed deck 28 for supporting the cargo in the cargo bed 24. The bed deck 28 extends generally horizontally across a width of the cargo bed 24 and lengthwise from a front end 30 of the cargo bed 24 to a rear end 32 of the cargo bed 24. A bed right sidewall 34 extends upward from the bed deck 28 and generally defines a right side of the cargo bed 24 and an opposite bed left sidewall 36 extends upward from the bed deck 28 to generally define a left side of the cargo bed 24.

The cargo bed 24 may include a bed forward endwall 38 forming the front end 30 of the cargo bed 24. The bed forward endwall 38 may extend upward from the bed deck 28 and widthwise between the bed right sidewall 34 and the bed left sidewall 36. A bed rear opening 40 in the cargo bed 24 provides access to an interior region 42 of cargo bed 24 for loading and unloading cargo. The bed rear opening 40 may be selectively closed off by a moveable tailgate 44 that extends between the bed right sidewall 34 and the bed left sidewall 36. A lower edge 46 of the tailgate 44 may be pivotally connected to the vehicle 20 to enable the tailgate to be pivoted between a closed position, in which the bed rear opening 40 is closed off, an open position that provides access to the interior region 42 of the cargo bed 24. A pair a tailgate support members 48 attached to the bed right and left sidewalls 34,36 and the tailgate 44 provide support for the tailgate 44 when arranged in the open position.

Depending on the configuration of the vehicle 20, the cargo bed 24 may or may not include a wheel well 50 that protrudes into the interior region 42 of the cargo bed 24. The wheel well 50 provides clearance between a rear wheel 52 of the vehicle 20 and the cargo bed 24. Some vehicles may be configured as a stepside that have the cargo bed sidewalls located inboard of the vehicle wheels, and consequently the wheel wells do not protrude into the interior region of the vehicle bed. Other vehicle configurations may have the bed sidewalls positioned over the rear wheels, as illustrated, for example, in FIG. 5, which may cause the wheel well 50 to extend into the interior region 42 of the cargo bed 24. The multi-purpose bed liner 22 may be used with either bed configuration, as well as others, regardless of whether the wheel well 50 extends into the interior region 42 of the cargo bed 24.

The vehicle may include a cab 54 for transporting a vehicle driver and passengers. The cab 54 may be located forward of the cargo bed 24, with a cab rear wall 56 located adjacent the bed forward endwall 38.

Figure 7:
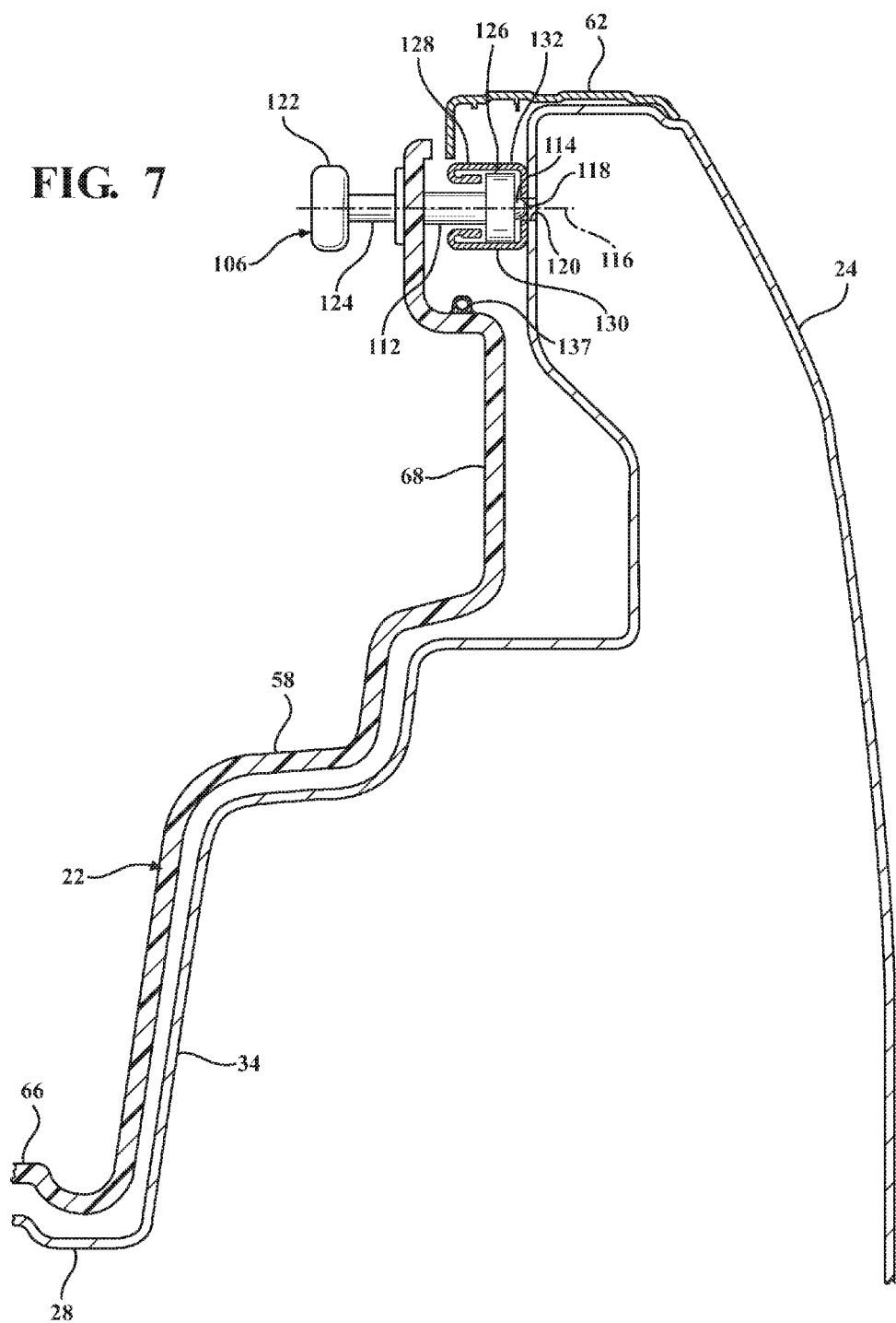
FIG. 7 is a partial cross-sectional view of the shell and cargo bed sidewall illustrating the pivot connector in an unlatched position.

With reference to FIGS. 2, 4, 7 and 8, the multi-purpose bed liner 22 may include a shell 58 that may be positioned in a bed liner position 60 within the cargo bed 24 to function as a bed liner 23, as illustrated, for example, in FIGS. 2 and 7. The shell 58 may also be inverted from the bed liner position 60 and positioned above an upper end 62 the bed right and left sidewalls 34,36 to function as the deck topper 25 when the multi-purpose bed liner 22 is arranged in a deck topper position 64, as illustrated, for example, in FIGS. 4 and 8. When arranged in the bed liner position 60 the shell 58 helps protect the cargo bed 24 from being damaged by cargo loaded in the cargo bed 24. When arranged in the deck topper position 64 the shell 58 encloses the cargo bed 24 to help secure cargo within the cargo bed 24 and provide protection from the elements.

Figure 3:
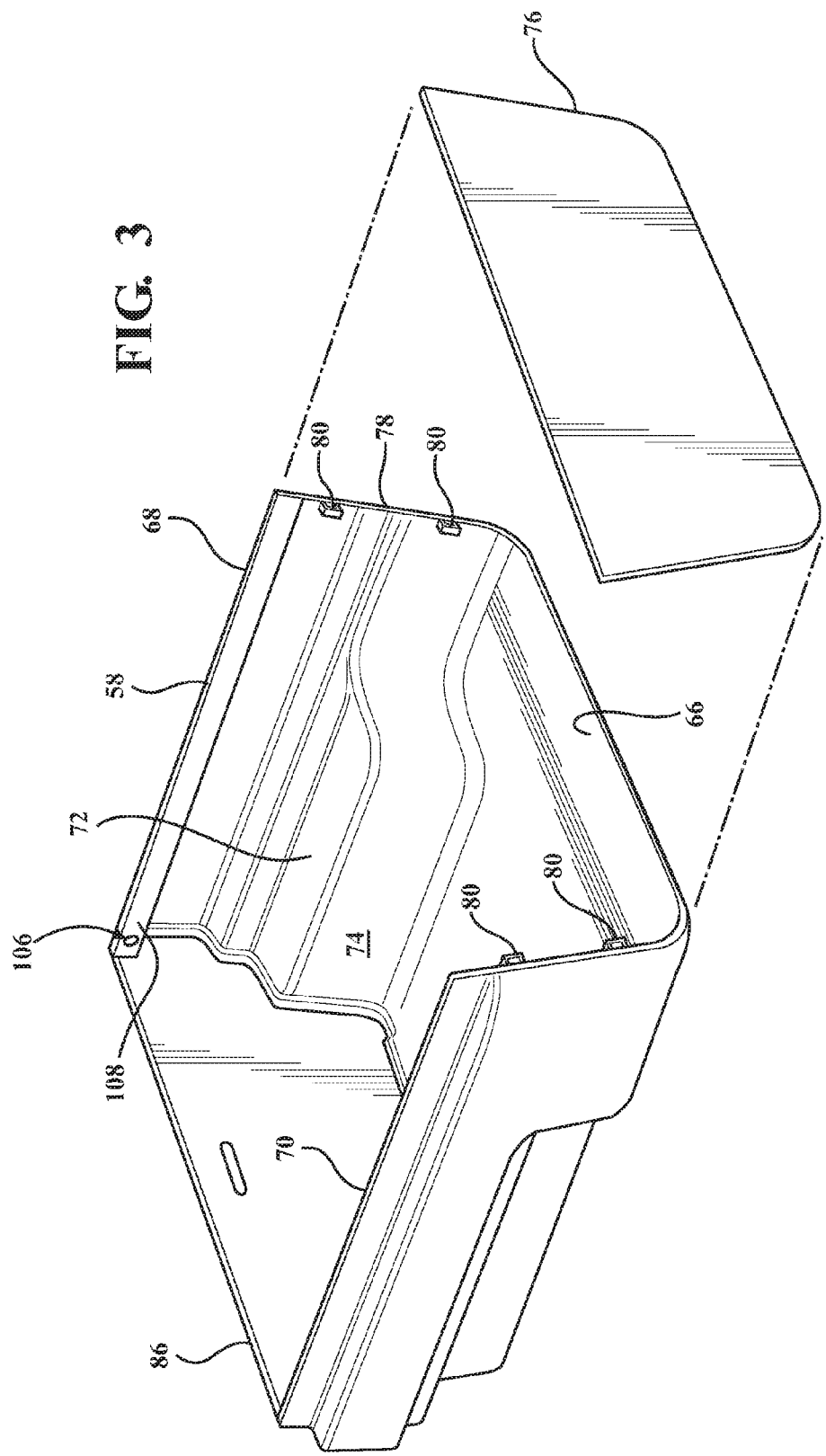
FIG. 3 rear perspective view of a shell that may be employed with the multi-purpose bed liner.

With reference to FIG. 3, the shell 58 may be configured to conform to a contour of the cargo bed 24 to maximize storage space within the shell 58 when arranged in the bed liner position 60. The shell 58 may include a shell base 66. A shell right sidewall 68 and a shell left sidewall 70 may extend generally upward from the shell base 66 when the multi-purpose bed liner 22 is arranged in the bed liner position 60.

The shell base 66 and the shell right and left sidewalls 68,70 may be integrally formed or the shell 58 may be formed from multiple interconnected components. The shell base 66 and the shell right and left sidewalls 68,70 may be made from various materials, including, but not limited to, metals, plastics, fiberglass and composite materials, including combinations thereof. The shell base 66 and the shell right and left sidewalls 68,70 may all be constructed from the same material or one or more components may be made of different materials.

With reference to FIGS. 2, 4, 7 and 8, the shell base 66 may be located adjacent the bed deck 28 and below the upper end 62 of the bed right and left sidewalls 34,36 when the shell 58 is arranged in the bed liner position 60, as illustrated, for example, in FIGS. 2 and 7. The shell right and left sidewalls 68,70 may be positioned adjacent an interior of the respective bed right and left sidewalls 34,36 when the shell 58 is arranged in the bed liner position 60. With the shell 58 inverted and arranged in the deck topper position 64, as illustrated, for example, in FIGS. 4 and 8, the shell base 66 may be located above both the bed deck 28 and the upper end 62 of the bed right and left sidewalls 34,36. The shell right and left sidewalls 68,70 extend downward from the shell base 66 and may be positioned above the upper end 62 of the bed right and left sidewalls 34,36 when the shell 58 is arranged in the deck topper position 64.

With reference to FIG. 3, depending on the configuration of the cargo bed 24, the shell 58 may include a wheel well recess 72 that protrudes inward toward an interior region 74 of the shell 58. The wheel well recess 72 provides clearance between the shell 58 and the wheel well 50 (see, for example, FIG. 5) on vehicle configurations in which the wheel well 50 extends into the cargo bed 24. The wheel well recess 72 may be optional for vehicle configurations in which the wheel well 50 does not extend into the interior region 42 of the cargo bed 24. Shell configurations that include a wheel well recess 72 may be used with vehicle bed configurations that have the wheel well 50 extending into the bed interior region 42, as well as a bed configuration in which the wheel well 50 is located entirely outside the cargo bed 24.

With reference to FIGS. 2-4, the multi-purpose bed liner 22 may include a first shell endwall 76 that may be removably attached to a rear end 78 of the shell 58 and positioned adjacent the bed rear opening 40 when the multi-purpose bed liner 22 is arranged in the bed liner position 60. One or more releasable connectors 80 may be used to releasably connect the first shell endwall 76 to the shell 58. The connectors 80 may be configured to enable the first shell endwall 76 to be selectively detached from the shell 58 when the multi-purpose bed liner 22 is arranged in the bed liner position 60. The first shell endwall 76 connects to the shell base 66 and extends between and connects to an end of the shell right sidewall 68 and shell left sidewall 70. With the multi-purpose bed liner 22 arranged in the bed liner position 60 the first shell endwall 76 may be entirely disconnected from the shell 58 to provide unencumbered access to the interior region 74 of the cargo bed 24. When detached from the shell 58, the first shell endwall 76 may be mounted to an inside surface 82 of the tailgate 44 for storage. One or more fasteners 84 may be used to attach the first shell endwall 76 to the tailgate 44. With the first shell endwall 76 attached to the shell 58 and the multi-purpose bed liner 22 arranged in the deck topper position 64, as illustrated, for example, in FIG. 4, the first shell endwall 76 may be located adjacent the cab 54 of the vehicle 20 and opposite the bed rear opening 40.

The multi-purpose bed liner 22 may include a second shell endwall 86 that may be pivotably connected to the shell base 66 opposite the first shell endwall 76. One or more hinge-type connectors 88 may be used to connect the second shell endwall 86 to the shell base 66. The second shell endwall 86 may be positioned adjacent the cab 54 and opposite the bed rear opening 40 when the multi-purpose bed liner 22 is arranged in the bed liner position 60. The second shell endwall 86 may be positioned adjacent the bed rear opening 40 and opposite the cab 54 when the multi-purpose bed liner 22 is arranged in the deck topper position 64.

Pivotably connecting the second shell endwall 86 to the shell base 66 enables the second shell endwall 86 to be selectively pivoted between a closed position, as illustrated, for example, in FIG. 3, and an open position, as illustrated, for example, in FIG. 4. When in the closed position the second shell endwall 86 extends between and engages the shell right sidewall 68 and the shell left sidewall 70. When arranged in the open position the second shell endwall 86 is displaced from the shell right sidewall 68 and the shell left sidewall 70.

With the multi-purpose bed liner 22 arranged in the deck topper position 64, the second shell endwall 86 may be selectively moved between the open and closed positions. Pivoting the second shell endwall 86 to the open position enables a user access the interior region 42 of the cargo bed 24. With the multi-purpose bed liner 22 arranged in the bed liner position 60, the second shell endwall 86 may be arranged in the closed position to act as a barrier to help protect the cab 54 from damage caused by cargo transported in the cargo bed 24.

With reference to FIGS. 1, 2, 4 and 5 to facilitate moving the multi-purpose bed liner 22 between the bed liner position 60 (see, for example, FIG. 2) and the deck topper position 64 (see, for example, FIG. 4), the shell 58 may be moveably connected to a pair of elongated slide rails 90 attached to the bed right sidewall 34 and the bed left sidewall 36. The slide rails 90 enable the shell 58 to be selectively moved axially along a longitudinal axis 92 of the slide rails 90 when moving shell 58 between the bed liner position 60 and an extended position 94, as illustrated, for example, in FIG. 1.

The pair of slide rails 90 may include a right slide rail 96 attached to the bed right sidewall 34 and a left slide rail 98 attached to the bed left sidewall 36. The longitudinal axis 92 of the right and left slide rails 96,98 may be oriented generally parallel to the bed deck 28. The right and left side rails 96,98 extend generally along an entire length of the cargo bed 24, from the front end 30 of the cargo bed 24 to the rear end 32. A front end 100 of the slide rails 90 may be located adjacent the front end 30 of the cargo bed 24 and a rear end 102 may be located adjacent the rear end 32 of the cargo bed 24. The slide rails 90 may be positioned vertically along the bed right and left sidewalls 34,36 between an upper end 106 of the wheel well 50 and the upper end 62 of the bed right and left sidewalls 34,36. The right and left slide rails 96,98 may be connected to the respective bed right and left sidewalls 34,36 using various connection mechanisms, such as, for example, bolts, screws, rivets and welding, as well as others.

With reference to FIGS. 2, 3, 6 and 7, the multi-purpose bed liner 22 may include a pivot connector 106 for connecting the shell 58 to the slide rails 90. The pivot connector 106 may be fixedly attached to an upper forward portion 108 of the shell right and left sidewalls 68,70. The pivot connector 106 operates to control axial movement of the shell 58 along the slide rail 58 (i.e., movement of the shell 58 between the bed liner position 60 and the extended position 94) as well as provide a pivot joint 110 when the shell 58 is arranged in the extended position 94 that enables the shell 58 to be pivoted between the extended position 94 and the deck topper position 64.

Figure 6:
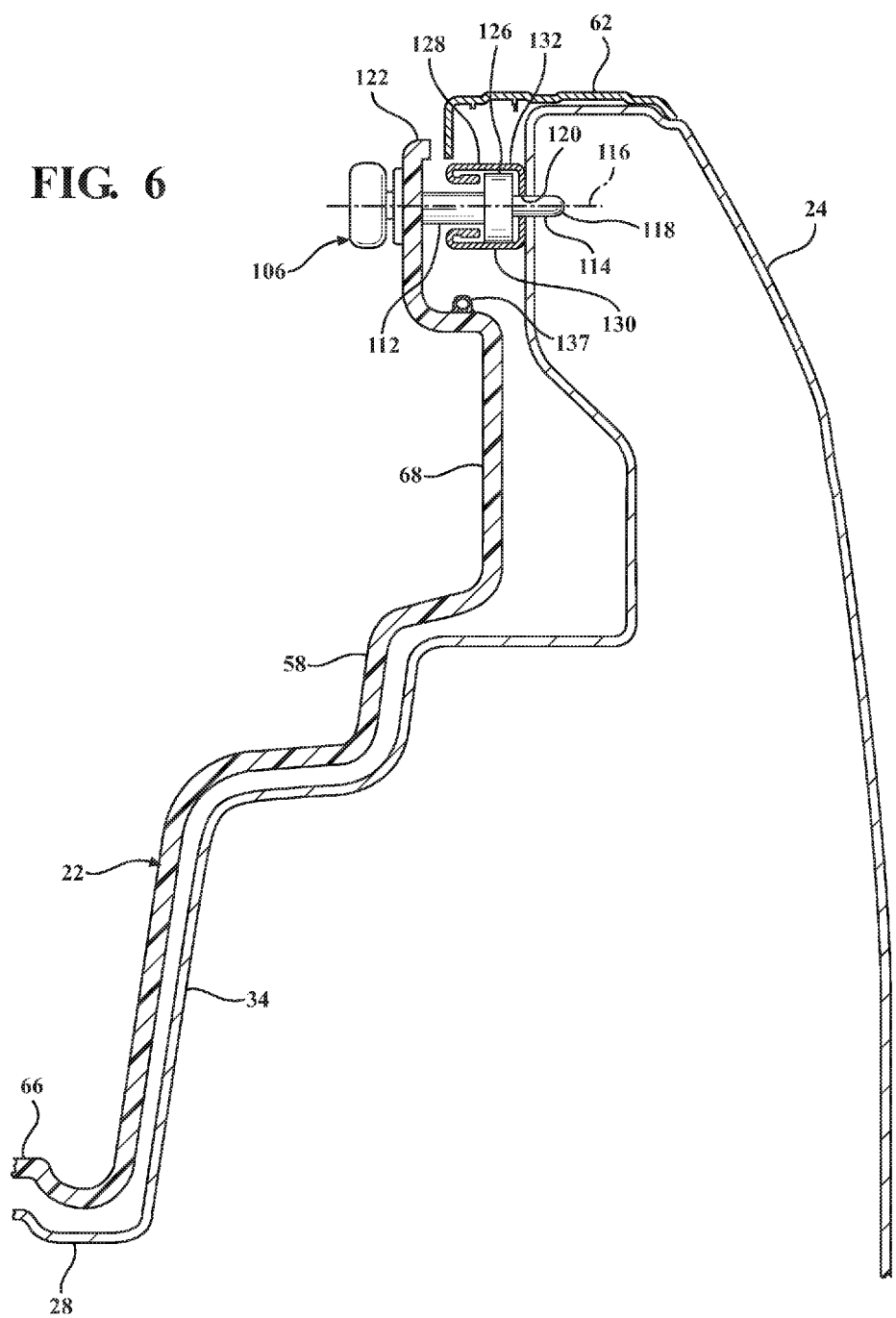
FIG. 6 is partial cross-sectional view of the shell and cargo bed sidewall illustrating a pivot connector for attaching the shell to the slide rail, with the pivot connector arranged in an unlatched position.

With reference to FIGS. 6 and 7, the pivot connector 106 may include a connector housing 112 attached to the shell right and left sidewalls 68,70. Extending from an end of the connector housing is a latch pin 114 that can be moved axially within the connector housing 112 along a longitudinal axis 116 of the latch pin 114. An end 118 of the latch pin 114 may be selectively engaged with an aperture 120 formed in the slide rails 90 and/or bed right and left sidewalls 34,36. The latch pin 114 may be moved along its longitudinal axis 116 between an extended position, as illustrated, for example, in FIG. 6, and a retracted position, as illustrated, for example, in FIG. 7.

A handle 122 may be attached to an end 124 of the latch pin 114 opposite the end 118 of the latch pin 114. The handle 122 provides a convenient handhold for a user to grasp when moving the latch pin 114 between the extended and retracted positions. The latch pin 114 is extended when the pivot connector 106 is in the latched position and retracted when the pivot connector 106 is in the unlatched position.

The pivot connector 106 may include a roller 126 that may be rotatably attached to connector housing 112 and engages the slide rails 90. The slide rails 90 may have a generally C-shaped configuration forming a channel 128 for receiving the roller 126. The roller 126 may roll along a lower leg 130 of the C-shaped channel 128 when moving the shell 58 between the bed liner position 60 and the extended position 94. An upper leg 132 of the C-shaped channel 128 may limit vertical movement of the roller 126, and thus the shell 58, relative to the cargo bed 24.

With reference to FIGS. 1, 6 and 7, the pivot connector 106 may be selectively moved between the latched position, as illustrated, for example, in FIG. 6, and the unlatched position, as illustrated, for example, in FIG. 7. When arranged in the latched position, the pivot connector 106 substantially prevents the shell 58 from being moved along the length of the slide rails 90 between the bed liner position 60 and the extended position 94. The shell 58 may be slid axially along the length of the slide rails 90 when the pivot connector 106 is arranged in the unlatched position. The pivot connector 106 also operates as the pivot joint 110 (see, for example, FIG. 1) when the pivot connector 106 is arranged in the latched position with the shell 58 arranged in the extended position 94.

With reference to FIGS. 1, 2 and 5, since the pivot connector 106 is fixedly attached to the shell 58, it moves in unison with the shell 58 when moving the shell 58 between the bed liner position 60 and the extended position 94. With the shell arranged in the bed liner position 60 (i.e., fully received within the cargo bed 24), the pivot connector 106 is located adjacent the front end 100 of the slide rails 90. The shell 58 may be secured in the bed liner position 60 by moving the pivot connector 106 to the latched position to engage the end 118 of the latch pin 114 with a front locking aperture 134 (see, for example, FIG. 5) located at the front end 100 of the slide rails 90. The pivot connector 106 may be moved to the unlatched position to disengage the latch pin 114 from the front locking aperture 134 to allow the shell 58 to be slid rearward along the slide rails 90 toward the extended position 94.

With the shell 58 located in the extended position 94, the pivot connector 106 may be moved to the latched position to engage the latch pin 114 with a rear locking aperture 136 in the slide rails 90 and/or bed right and left sidewalls 34,36. With the pivot connector 106 in the latched position the latch pin 114 may function as the pivot joint 110 to enable the shell 58 to be pivoted between the extended position 94 and the deck topper position 64. The latched pivot connector 106 also prevents the shell 58 from being slid lengthwise along the slide rails 90 when pivoting the shell 58 between the extended position 94 and the deck topper position 64. The pivot connector 106 may be moved to the unlatched position to disengage the latch pin 114 from the rear locking aperture 136 to allow the shell 58 to be slide forward along the slide rails 90 from the extended position 94 toward the bed liner position 60.

With reference to FIGS. 6-8, a seal 137 may be attached to the shell right and left sidewalls 68,70 proximate to the right and left slide rails 96,98. The seal 137 extends lengthwise along the shell right and left sidewalls 68,70 from the front end 30 to the rear end 32 of the cargo bed 24. The seal 137 may engage the upper end 62 of the bed right and left sidewalls 34,36 to provide a generally waterproof seal between the shell 58 and the cargo bed 24 when the shell is arranged in the deck topper position 64, as illustrated for example, in FIG. 8.

With reference to FIGS. 1-4 and 6-8, the multi-purpose bed liner 22 may be selectively moved from the bed liner position 60, as illustrated, for example, in FIG. 2, to the deck topper position 64, as illustrated, for example, in FIG. 4, by initially removing the shell first endwall 76 from its stored location on the tailgate 44 and attaching it to the shell 58, as illustrated, for example, in FIG. 3. The pivot connector 106 may then be moved from the latched position (see, for example, FIG. 6) to the unlatched position (see, for example, FIG. 7) to enable the shell 58 to be slide rearward along the slide rails 90 from the bed liner position 60 to the extended position 94, as illustrated, for example, in FIG. 1. With the shell 58 arranged in the extended position 94, the pivot latch 106 may be moved from the unlatched position to the latched position. This prevents the shell 58 from sliding forward along the slide rails 90 when pivoting the shell 58 from the extended position 94 to the deck topper position 64. With the shell 58 arranged in the extended position 94 and the pivot connector 106 in the latched position the shell may be pivoted around the pivot joint 110 from the extended position 94 to the deck topper position 64, as illustrated, for example, in FIG. 1. With the shell 58 arranged in the deck topper position 64, the shell second endwall 86 may be selectively moved between the open and closed positions, as illustrated, for example, in FIG. 4. The multi-purpose bed liner 22 may be moved from the deck topper position 64 to the bed liner position 60 by reversing the process.

It is intended that the scope of the present methods and apparatuses be defined by the following claims. However, it must be understood that the disclosed systems and methods may be practiced otherwise than is specifically explained and illustrated without departing from its spirit or scope. It should be understood by those skilled in the art that various alternatives to the configurations described herein may be employed in practicing the claims without departing from the spirit and scope as defined in the following claims. The scope of the disclosed systems and methods should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc., should be read to recite one or more of the indicated elements unless a claim recites an explicit limitation to the contrary. It is intended that the following claims define the scope of the device and that the method and apparatus within the scope of these claims and their equivalents be covered thereby. In sum, it should be understood that the device is capable of modification and variation and is limited only by the following claims.

What is claimed is:

1. A multi-purpose vehicle bed liner comprising:
a shell connectable to a vehicle bed and selectively movable between a bed liner position and an inverted deck topper position, the shell comprising a shell base and a shell sidewall extending from the shell base, the shell base located vertically between a vehicle bed deck and an upper edge of a vehicle bed sidewall when the shell is attached to the vehicle in the bed liner position, the shell base being located vertically above the upper edge of the vehicle bed sidewall when the shell is attached to the vehicle in the deck topper position;
a slide rail attached to the shell sidewall, the slide rail moveable axially along its longitudinal axis relative to the shell and fixedly connectable to the vehicle bed sidewall; and a pivot connector fixedly attached to the shell and pivotally connecting the shell to the slide rail, the pivot connector movable axially along a longitudinal axis of the slide rail wherein the shell sidewall comprises a first shell sidewall and a second shell sidewall located opposite the first shell sidewall, and further comprising a first shell endwall removably connected to the first shell sidewall, the second shell sidewall and the shell base, wherein the first shell endwall is located adjacent a cab of the vehicle and opposite a rear opening in the vehicle bed when the shell is attached to the vehicle in the deck topper position and is located adjacent the rear opening in the vehicle bed and opposite the cab when the shell is attached to the vehicle in the bed liner position.

2. The multi-purpose vehicle bed liner of claim 1 further comprising a second shell endwall pivotably connected to the shell base and extending between and engaging the first shell sidewall and the second shell sidewall, the second shell endwall located adjacent the rear opening in the vehicle bed and opposite the cab when the shell is attached to the vehicle in the deck topper position and is located adjacent the cab and opposite the rear opening in the vehicle bed when the shell is attached to the vehicle in the bed liner position.

3. The multipurpose vehicle bed liner of claim 2, wherein the second shell endwall is selectively moveable between a closed position and an open position when the shell is attached to the vehicle in the deck topper position, the second shell endwall connected to the first shell sidewall and the second shell sidewall when the second shell endwall is arranged in the closed position, and the second shell endwall displaced from the first shell sidewall and the second shell sidewall when the second shell endwall is arranged in the open position.

4. The multi-purpose vehicle bed liner of claim 2, wherein the slide rail is moveable along its longitudinal axis relative to the shell between a first slide rail position, in which a first end of the slide rail is located adjacent the second shell endwall and an opposite second end of the slide rail is displaced a distance from the second shell endwall, and a second slide rail position, in which the second end of the slide rail is located adjacent the second shell endwall and the first end of the slide rail is displaced a distance from the second shell endwall, the pivot connector being located adjacent the first end of the slide rail when the slide rail is in the first slide rail position and is located adjacent the second end of the slide rail when the slide rail is in the second slide rail position.

5. A multi-purpose vehicle bed liner comprising:
a shell connectable to a vehicle bed and selectively movable between a bed liner position and an inverted deck topper position, the shell comprising a shell base and a shell sidewall extending from the shell base, the shell base located vertically between a vehicle bed deck and an upper edge of a vehicle bed sidewall when the shell is attached to the vehicle in the bed liner position, the shell base being located vertically above the upper edge of the vehicle bed sidewall when the shell is attached to the vehicle in the deck topper position;
a slide rail attached to the shell sidewall, the slide rail moveable axially along its longitudinal axis relative to the shell and fixedly connectable to the vehicle bed sidewall; and
a pivot connector fixedly attached to the shell and pivotally connecting the shell to the slide rail, the pivot connector movable axially along a longitudinal axis of the slide rail, wherein the shell sidewall comprises a wheel well recess protruding inward toward an interior region of the shell for providing clearance between the shell and a vehicle wheel well when the shell is attached to the vehicle in the bed liner position, the slide rail moveably attached to a region of the shell sidewall between the wheel well recess and an edge of the shell sidewall opposite the shell base.

6. The multi-purpose vehicle bed liner of claim 5, wherein the wheel well recess extends from a forward end of the shell to an intermediate location between the forward end of the shell and a rear end of the shell when the shell is attached to the vehicle in the bed liner position.

7. The multi-purpose vehicle bed liner comprising:
a shell connectable to a vehicle bed and selectively movable between a bed liner position and an inverted deck topper position, the shell comprising a shell base and a shell sidewall extending from the shell base, the shell base located vertically between a vehicle bed deck and an upper edge of a vehicle bed sidewall when the shell is attached to the vehicle in the bed liner position, the shell base being located vertically above the upper edge of the vehicle bed sidewall when the shell is attached to the vehicle in the deck topper position;
a slide rail attached to the shell sidewall, the slide rail moveable axially along its longitudinal axis relative to the shell and fixedly connectable to the vehicle bed sidewall; and
a pivot connector fixedly attached to the shell and pivotally connecting the shell to the slide rail, the pivot connector movable axially along a longitudinal axis of the slide rail, wherein the pivot connector comprises a latch moveable between a latched position, in which the latch engages the slide rail to restrict axial movement of the slide rail relative to the shell, and an unlatched position, in which the latch is disengaged from the slide rail to allow axial movement of the slide rail relative to the shell.

8. A multi-purpose vehicle bed liner comprising:
a shell connectable to a vehicle bed and selectively movable between a bed liner position and an inverted deck topper position, the shell comprising a shell base and a shell sidewall extending from the shell base, the shell base located vertically between a vehicle bed deck and an upper edge of a vehicle bed sidewall when the shell is attached to the vehicle in the bed liner position, the shell base being located vertically above the upper edge of the vehicle bed sidewall when the shell is attached to the vehicle in the deck topper position, the shell sidewall comprising a wheel well recess protruding inward toward an interior region of the shell for providing clearance between the shell and a vehicle wheel well when the shell is attached to the vehicle in the bed liner position, the wheel well recess extending from a forward end of the shell to an intermediate location between the forward end of the shell and a rear end of the shell when the shell is attached to the vehicle in the bed liner position; and
a slide rail attached to a region of the shell sidewall between the wheel well recess and an edge of the shell sidewall opposite the shell base, the slide rail moveable axially along its longitudinal axis relative to the shell and fixedly connectable to the vehicle bed sidewall.

9. The multi-purpose vehicle bed liner of claim 8, wherein the shell sidewall comprises a first shell sidewall and a second shell sidewall located opposite the first shell sidewall, and further comprising a first shell endwall removably connected to the first shell sidewall, the second shell sidewall and the shell base, wherein the first shell endwall is located adjacent a cab of the vehicle and opposite a rear opening in the vehicle bed when the shell is attached to the vehicle in the deck topper position and is located adjacent the rear opening in the vehicle bed and opposite the cab when the shell is attached to the vehicle in the bed liner position.

10. The multi-purpose vehicle bed liner of claim 9 further comprising a second shell endwall pivotably connected to the shell base and extending between and engaging the first shell sidewall and the second shell sidewall, the second shell endwall located adjacent the rear opening in the vehicle bed and opposite the cab when the shell is attached to the vehicle in the deck topper position and is located adjacent the cab and opposite the rear opening in the vehicle bed when the shell is attached to the vehicle in the bed liner position.

11. The multipurpose vehicle bed liner of claim 10, wherein the second shell endwall is selectively moveable between a closed position and an open position when the shell is attached to the vehicle in the deck topper position, the second shell endwall connected to the first shell sidewall and the second shell sidewall when the second shell endwall is arranged in the closed position, and the second shell endwall displaced from the first shell sidewall and the second shell sidewall when the second shell endwall is arranged in the open position.

12. The multi-purpose vehicle bed liner of claim 10 further comprising a pivot connector fixedly attached to the shell and pivotally connecting the shell to the slide rail, the pivot connector movable axially along a longitudinal axis of the slide rail, the slide rail being moveable along its longitudinal axis relative to the shell between a first slide rail position, in which the pivot connector is located adjacent a first end of the slide rail, and a second slide rail position, in which the pivot connector is located adjacent a second end of the slide rail.

13. The multi-purpose vehicle bed liner of claim 12, wherein the pivot connector comprising a latch moveable between a latched position, in which the latch engages the slide rail to restrict axial movement of the slide rail relative to the shell, and an unlatched position, in which the latch is disengaged from the slide rail to allow axial movement of the slide rail relative to the shell.

14. A vehicle convertible between an open bed configuration and a closed bed configuration, the vehicle comprising:
a vehicle cab for transporting passengers;
a vehicle bed located adjacent the vehicle cab, the vehicle bed comprising a bed deck and a bed sidewall extending generally upward from the bed deck and a bed rear opening defined at least partially by the bed deck and the bed sidewall;
a vehicle wheel well extending vertically upward from the bed deck and horizontally inward toward a center of the vehicle bed from the bed sidewall;
a shell connected to the vehicle bed and selectively movable between a bed liner position and an inverted deck topper position, the shell comprising a shell base and a shell sidewall extending from the shell base, the shell base being located vertically below an upper edge of the bed sidewall when the shell is in the bed liner position and vertically above the upper edge of the vehicle bed sidewall when the shell is in the deck topper position, the shell sidewall comprising a wheel well recess protruding inward toward a center of the shell for providing clearance between the shell and the vehicle wheel well when the shell is in the bed liner position; and
a slide rail attached to the bed sidewall at a location between an upper end of the vehicle wheel well and the upper edge of the bed sidewall, the shell slideably attached to the slide rail.

15. The vehicle of claim 14, wherein the shell is moveable along a longitudinal axis of the slide rail relative to the vehicle bed between a bed liner position and an extended position, and further comprising a pivot connector fixedly attached to the shell and pivotally connecting the shell to the slide rail, the pivot connector comprising a latch moveable between a latched position, in which the latch engages the slide rail to restrict axial movement of the shell relative to the vehicle bed, and an unlatched position, in which the latch is disengaged from the slide rail to allow axial movement of the shell relative to the vehicle bed.

16. The vehicle of 15, wherein the pivot connector is movable axially along the longitudinal axis of the slide rail.

17. The vehicle of claim 14, wherein the shell sidewall comprises a first shell sidewall and a second shell sidewall located opposite the first shell sidewall, and further comprising a first shell endwall removably connected to the first shell sidewall, the second shell sidewall and the shell base, and a second shell endwall located opposite the first shell endwall and pivotably connected to the shell base and extending between and engaging the first shell sidewall and the second shell sidewall, the first shell endwall being located adjacent the vehicle cab and opposite the bed rear opening when the shell is in the deck topper position and located adjacent the bed rear opening and opposite the vehicle cab when the shell is in the bed liner position, and the second shell endwall being located adjacent the vehicle cab and opposite the bed rear opening when the shell is in the bed liner position and located adjacent the bed rear opening and opposite the vehicle cab when the shell is in the deck topper position.

18. The vehicle of claim 17, wherein the second shell endwall is selectively moveable between a closed position and an open position when the shell is in the deck topper position, the second shell endwall engaging the first shell sidewall and the second shell sidewall when the second shell endwall is arranged in the closed position, and the second shell endwall being displaced from the first shell sidewall and the second shell sidewall when the second shell endwall is arranged in the open position.

19. The multi-purpose vehicle bed liner of claim 17, wherein the first shell endwall is connected to the first shell sidewall, the second shell sidewall and the shell base when the shell is in the deck topper position, and is detached from the first shell sidewall, the second shell sidewall and the shell base when the shell is in the bed liner position, and further comprising a fastener operable for connecting the first shell endwall to a tailgate of the vehicle when the shell is in the bed liner position.

* * * * *

UNITED STATES PATENT AND TRADEMARK OFFICE
CERTIFICATE OF CORRECTION

PATENT NO. : 9,975,501 B1
APPLICATION NO. : 15/611185
DATED : May 22, 2018
INVENTOR(S) : Scott L. Frederick, Scott P. Robison and Adam D. Holmstrom It is certified that error appears in the above-identified patent and that said Letters Patent is hereby corrected as shown below:

In the Claims

Column 8, Line 60 Claim 1 reading "the vehicle" should read --a vehicle--

Column 9, Line 56 Claim 5 reading "the vehicle" should read --a vehicle--

Column 10, Line 20 Claim 7 reading "the vehicle" should read --a vehicle--

Column 10, Line 45 Claim 8 reading "the vehicle" should read --a vehicle--

Column 12, Line 52 Claim 19 reading "The multi-purpose vehicle bed line of claim 17" should read --The vehicle of claim 17--

Signed and Sealed this
Sixteenth Day of April, 2019

Andrei Iancu
*Director of the United States Patent and Trademark Office*